Patented Jan. 13, 1953

2,625,487

UNITED STATES PATENT OFFICE 2,625,487

MODIFICATION OF LARD

De Witte Nelson, Elmhurst, and Karl F. Mattil, Chicago, Ill., assignors to Swift & Company, Chicago, Ill., a corporation of Illinois No Drawing. Application May 8, 1952, Serial No. 286,814

8 Claims. (Cl. 99—118)

The present invention relates to the treatment of lard, and more particularly to the production of lard and lard-containing products having improved properties.

Lard, commercially the most important triglyceride material from an animal source, is fat obtained from the fatty tissue of hogs by a heat, solvent or enzyme treatment of the fatty tissue. The most common method of obtaining lard from the fatty tissue of hogs is the so-called wet or steam rendering treatment in which the fat is separated from the tissue by means of pressure with hot water or steam to give what is known as prime steam lard. Another common method of obtaining lard is by the dry rendering process in which fat is removed from the fatty tissue by means of heat alone. The latter method of obtaining lard includes the kettle rendering process in which the fat is melted in a hot water or a steam jacketed kettle. Other methods of obtaining lard, such as solvent and enzymatic treatment of fatty animal tissue, while not widely used on a commercial scale, are potentially important sources of lard.

After recovering the lard from the fatty tissue, the lard is generally treated to impart certain desired characteristics thereto. Thus, the lard may be settled, bleached, refined, washed, filtered, and deodorized to yield a substantially odorless and tasteless product.

Lard is often further treated to impart thereto the desired degree of plasticity, as when the lard is to be used in baked products. This desired plasticity may be obtained by a process which includes compounding therewith hardened lard or an hydrogenated vegetable fat, incorporating air therein and chilling. Of particular importance in the texturizing process is the chilling step. This chilling of the lard may be accomplished by means of chill rolls or an internal chilling machine. In the former method molten fat is picked up on the surface of the internally chilled rotating rolls and then subsequently scraped therefrom and further worked to give the lard a uniform plastic consistency. Chilling by means of an internal chilling machine is accomplished by passing molten fat through a series of vertical or horizontal units where the fat is supercooled and allowed to solidify while being rapidly worked. The lard product treated in the foregoing manner is generally employed as a shortening. Heretofore the plasticity of the final product has depended to a great extent on the nature of the foregoing chilling operation, and the final plasticity has been highly sensitive to the conditions of the chilling step. For this reason the operating conditions in the chilling step have necessarily been very critical and required very careful control.

Another important characteristic of a shortening is its creaming ability. This creaming ability is a measure of the amount of air that can be incorporated into a batter during the mixing operation. The greater the amount of air absorbed and retained by the fat, the greater the leavening effect of the shortening. Thus, for example, the texture and volume of a cake may be improved by the use of shortening possessing superior creaming properties. The creaming ability of a shortening may be determined by measuring the density of the batter or dough, or by measuring the volume of a cake in which the shortening has been incorporated. A high specific gravity indicates a relatively dense mass with only a small amount of incorporated air, while a low specific gravity indicates a light, fluffy mass having a large amount of air incorporated therein. In general, the value of a shortening increases with its ability to absorb air.

Still another very important characteristic of a shortening is its appearance, particularly after being held at the elevated temperatures frequently encountered during distribution and sale of the product. Solidified animal triglyceride material such as lard and lard-containing products frequently have a dull, waxy, and Vaseline-like appearance which becomes progressively more pronounced the longer the product is held. The appearance of lard and lard-containing products is generally considered much inferior to the appearance of vegetable shortenings which have been held under comparable storage conditions, since vegetable shortenings possess a smooth, satiny luster which is retained even after prolonged storage.

While lard has unsurpassed shortening properties, the vegetable shortenings have been considered to have superior creaming and emulsifying properties as well as improved appearance and storing properties. One of the principal causes for the inferiority of the appearance, storing properties, creaming ability, and emulsifying properties of the lard is the needle-like, crystal formation which the lard glyceride molecules assume upon solidifying and which continue to grow during storage. The long, needle-like crystals impart to lard and lard-containing products the waxy, rubber-like texture or graininess which becomes much more pronounced and highly objectionable on standing at the relatively high temperatures generally encountered when distributing through normal commercial channels. Although it has been found possible to temporarily alter the crystallization pattern of lard by packaging while holding the lard at a carefully controlled, relatively low temperature, the lard crystals soon revert to their natural long, needle-like form when the lard is allowed to stand at room temperature. For this reason, the foregoing temperature treatment during the packaging of lard is of no practical value when applied to lard which is to be distributed through normal commercial channels.

In order to overcome the foregoing objectionable properties of lard and lard-containing products which have been found to be attributable to the normal crystallization habit of lard, it is an essential object of the present invention to permanently alter the normal crystallization habit of the lard to that of hydrogenated vegetable oil shortening.

An additional object within the broad scope of the invention is to provide lard in which the heat of crystallization normally associated with the said lard is substantially altered.

Another object of the invention is to provide a product containing lard having improved plastic properties, including improved pliability and workability.

An additional object of the invention is to provide a lard product having improved appearance characterized by a smooth velvety sheen typical of hydrogenated vegetable oil shortening.

A further object of the invention is to provide a lard product having properties which equal or excel those of vegetable shortening while maintaining the superior shortening characteristic of lard.

Still another object of the invention is to provide a lard product having improved baking and keeping qualities, including enhanced emulsifying and creaming properties.

A further object of the invention is to provide a satisfactory lard product which can be texturized with a greater degree of flexibility in the operating conditions.

Still further objects of the invention will be apparent from the following description and claims.

In accordance with the present invention, it is proposed to subject lard to a heat treatment in the presence of a substance capable of changing the crystallization properties thereof under conditions which do not cause an appreciable change in the melting point of the glyceride material or a significant change in the proportion of the several types of triglyceride molecules in the fatty material being treated. The reaction which modifies the triglyceride molecules in highly complex and the mechanism is not completely understood. It has been observed, however, that the crystal habit and the heat of crystallization of the triglyceride molecules of lard are very significantly affected. And, since the substances capable of modifying the crystallization properties of triglyceride molecules do not become part of the crystal modified triglyceride molecules, the reaction appears to be catalytic. Therefore, the effective substances are herein referred to as crystal modifying catalysts.

In marked contrast with the previous method of catalytically treating lard, the herein-disclosed crystal modifying treatment does not cause an appreciable change in the melting point of the material, chemical composition of the fatty acid groups of the glyceride molecules, nor a significant change in the proportions of the several types of glyceride molecules in the material being treated.

More particularly the present invention contemplates heating lard at relatively moderate temperatures in the presence of a crystal modifying catalyst for a period sufficient to substantially alter the normal crystallization habits of the triglyceride molecules.

It has been found that sodium amide is a very effective crystal modification catalyst in accomplishing the purposes of the present invention. The sodium amide may be used either as a dispersion of the amide in oil or in dry powdered form.

The concentration of catalyst depends somewhat upon the condition of the sodium amide catalyst and the fatty material being treated, and generally varies between about 0.1 and 1.2 per cent by weight, although larger amounts do not prevent modification. If the fatty material is refined to remove all free fatty acids and all moisture driven out prior to treating with the crystal modification catalyst, a smaller concentration of catalyst on the order of about 0.15 can be used. It has been observed that a lard having a high peroxide value requires a larger amount of catalyst to completely crystal modify than a lard which has a low peroxide value. It is therefore desirable to employ a lard having a relatively low peroxide value.

The time of treatment required to produce crystal modified lard varies with the temperature and the concentration of catalyst employed and must be carefully correlated in order to produce crystal modified lard. Within the preferred temperature range the reaction proceeds very rapidly, while at low temperatures below about 50°–60° C. the speed of reaction is extremely slow. The minimum preferred temperature at which the crystal modification reaction may be carried out is the temperature at which the highest melting point constituent of the material being treated will just remain in solution, since removal from solution of the higher melting point constituents is undesirable. When the concentration of catalyst is reduced below the optimum concentration, more time is required to complete the crystal modified reaction, and if the effective lowest concentration of catalyst is not used, no significant modification occurs even after prolonged treatment.

When a sufficient quantity of catalyst is used the time required for crystal modification treatment is dependent primarily on the temperature at which the treatment is carried out. At temperatures above 90° C. the crystal modification reaction proceeds rapidly and is generally completed in a period of 15 minutes or less, with the reaction at the higher temperatures of about 120° C. taking place generally within about 5 minutes. In commercial operations, however, it is not unusual to treat the lard for periods as long as 10 minutes to 1 hour at temperatures in the neighborhood of 80°–100° C. When using the catalyst in the form of an oil dispersion, it has been found that larger percentages are generally required in order to perform the modification in the same length of time required for crystal modification of the same lard at the same temperature using the dry powdered sodium amide catalyst. At temperatures below about 50° C., longer periods of heating and greater amounts of catalyst are required, and it is generally considered impractical to conduct the crystal modification reaction at the foregoing low temperatures. As the temperatures approach 250° C. the color of the modified lard becomes so dark as to be undesirable as an edible fat. The practical temperature range within which crystal modification can be effected with this catalyst is between about 50° and 250° C. but is preferably between about 80° and 120° C.

Incompletely modified lard gives only a temporary increase in pound cake volume and does not possess the same crystal habit as hydrogenated vegetable oil shortening, e. g., hydrogenated cottenseed oil shortening, nor does it possess the improved keeping properties of crystal modified lard. In practice, the completion of the crystal modification reaction is clearly indicated by the forming of a reddish-brown color throughout the lard mixture as soon as crystal modification has taken place. This change in color does not permanently impair the color of the final lard since it is substantially removed during the conventional bleaching treatment of lard.

The lard may be heated in the presence of the catalyst at any stage of processing and the beneficial results of the crystal modifying treatment are not impaired by subsequent processing such as deodorization and hydrogenation. It is also unnecessary to hold the crystal modified product at any particular temperature in order to retain the beneficial properties imparted to the material. It is, however, preferred to treat the lard with the catalyst prior to refining thereof.

The specific examples given herein illustrate the treatment of lard using sodium amide in dry powdered form, and also in the form of an oil dispersion, as the crystal modifying catalyst. In all cases, the treated lard possessed a striking appearance which was quite different from that of untreated lard and had the characteristic satiny luster of vegetable shortening that readily distinguished it from conventional lard. In addition, the plastic properties of the treated lard were superior and cakes made therewith generally had a larger volume and a finer grain and texture than the cakes made with untreated lard. Although cake volume cannot be considered the standard for determining crystal modification, indications are that dough prepared with the modified lard is capable of entrapping greater quantities of air than is the case with dough made with untreated lard. The texture and fine grain of the cakes also indicate a uniform dispersal of the air throughout the dough.

The specific examples to follow should be considered as merely illustrative of the herein-described process and resulting product and should in no way be construed to limit the invention to the particular materials or conditions disclosed therein:

Example I

Thoroughly dried prime steam lard was crystal modified in 10 minutes at 100° C. with 0.2 per cent powdered sodium amide catalyst, based on the weight of the dried lard. The crystal modified lard was analyzed after bleaching for the following properties:

Softening point _____ 101° F.
Melting point _____ 108° F.
Lovibond color _____ 20Y 1.0R.

Example II 2547 pounds of dried prime steam lard having the following characteristics—

FFA _____ 0.43%.
Lovibond color _____ 4.0Y 0.5R.
S. P _____ 100° F.
M. P _____ 113° F.
I No _____ 64.2
Moisture _____ 0.02%.

were heated to 88° C. While being agitated, 8 pounds of sodium amide were added in the form of a slurry with 50 pounds of melted lard. After twenty minutes of heating, the lard changed color to a characteristic reddish brown shade and was found to be modified. The lard was then cooled to 65° C. and the excess catalyst inactivated by adding water. A foots formed which, after settling, was separated from the lard. The lard was water washed by agitating with 50 gallons of water at 82° C. After withdrawing the wash water, the modified lard was bleached with 1 per cent bleaching clay. It now had the following characteristics:

FFA _____ 0.09%.
Lovibond color _____ 20Y 1.9R.
S. P _____ 91° F.
M. P _____ 110° F.
I No _____ 64.5

The bleached modified lard was then formulated with hard fat to give it the desired consistency and, after chilling, was filled into three-pound cans. After tempering, the consistency as measured with a Bloom consistometer was 43 at 77° F. The chilled shortening had a smooth, satiny luster, similar to hydrogenated cottonseed oil base shortening.

In a similar manner, other three-pound cans were filled with chilled shortening formulated from unmodified lard containing a like amount of added hard fat. After tempering, this shortening had a consistency of 35 at 77° F. when measured with a Bloom consistometer. The appearance of the product was slightly dull.

Other samples of each type of product were held at 100° F. for 7 days. When they were examined, the modified lard still retained its smooth, satin-like appearance and fine texture. The unmodified lard had become dull and the texture was slightly grainy.

These tests demonstrate the superiority of shortening made from modified lard and also its ability to maintain this superiority even under adverse storage conditions such as storage at 100° F.

Example III

Thoroughly dried prime steam lard was mixed with 2 per cent sodium amide in oil dispersion (50% active catalyst) based on the weight of the dried lard and heated at a temperature of 60° C. for a period of 4 hours. At the end of this heating period, the lard mixture was reddish-brown in color and was found to be completely crystal modified. The crystal modified lard exhibited the following physical characteristics after treatment:

°F.
Softening point _____ 100
Melting point _____ 107
Cloud _____ 80

In addition to the foregoing properties, the treated lard exhibited the characteristic velvety sheen associated with crystal modified lard.

*Example IV*

Thoroughly dried prime steam lard was heated at 78° C. with 2 per cent, based on the weight of the dried lard, of the same sodium amide catalyst employed in Example III for a period of 55 minutes. At the end of the heating period, the lard mixture was reddish-brown in color and was found to be completely crystal modified. The modified lard was then divided into two portions and the catalyst removed therefrom by two different methods. In the first method, the modified lard was filtered from the catalyst, while in the second method the catalyst was inactivated by pouring the modified lard into water. In this second method quantities of gaseous ammonia were freed, causing the foots to float. The filtration method of removing catalyst tends to be a bit difficult because of the formation of soaps. The water deactivation effectively hydrates these soaps to form "foots," with attendant liberation of ammonia gas causing the foots to float. Analysis of the samples obtained showed:

|  | Filtered Sample | Water-washed Sample |
| --- | --- | --- |
|  | ° F. | ° F. |
| Softening Point | 96 | 96 |
| Melting Point | 112 | 107 |
| Cloud | 80 | 82 |

*Example V*

Thoroughly dried prime steam lard was heated to 103° C. with 1.53 per cent, based on the weight of the dried lard, of sodium amide catalyst dispersed in oil (50% active catalyst) for a period of 15 minutes. The resulting crystal modified lard had the following properties:

Free fatty acids _____ per cent__ 0.20
Softening point _____ °F__ 93
Melting point _____ °F__ 109
Cloud _____ °F__ 98

*Example VI*

Thoroughly dried prime steam lard was heated for 25 minutes at 150° C. with 2 per cent of a sodium amide in oil catalyst (50% active catalyst), based on the weight of the dried lard. At the end of this time, crystal modification had taken place and the resultant product was found to have the following properties:

Free fatty acids _____ per cent__ 0.05
Softening point _____ °F__ 89
Melting point _____ °F__ 106
Cloud _____ °F__ 96

*Example VII*

Thoroughly dried prime steam lard was heated for 5 minutes at 185° C. with 1.1 per cent of a sodium amide catalyst dispersed in oil (50% active catalyst), based on the weight of the dried lard. The physical properties of the resulting crystal modified lard were:

°F.
Softening point _____ 87
Melting point _____ 108
Cloud _____ 74

*Example VIII*

Thoroughly dried prime steam lard was heated at 200° C. with 0.6 per cent, based on the weight of the dried lard, of sodium amide catalyst dispersed in oil (50% active catalyst). Crystal modification took place well within 5 minutes at this temperature and catalyst concentration. The properties of the crystal modified lard were:

°F.
Softening point _____ 95
Melting point _____ 107
Cloud _____ 76

*Example IX*

Thoroughly dried prime steam lard was treated with 1.1 per cent of the catalyst of Example VIII, based on the weight of the dried lard, at a temperature of 250° C. Crystal modification took place almost instantaneously, being completed well within 5 minutes heating. The resulting crystal modified lard had the following properties:

° F.
Softenting point _____ 91
Melting point _____ 106
Cloud _____ 78

*Example X*

Thoroughly dried prime steam lard was crystal modified in 1 hour at 50° C. with 1.2 per cent powdered sodium amide catalyst, based on the weight of the dried lard. After modification the lard was poured into water to deactivate the catalyst, and then water-washed and bleached. Analysis showed:

Softening point _____ 101° F.
Melting point _____ 109° F.
Cloud _____ 84° F.
Lovibond color _____ 3Y/0.3R

*Example XI*

Thoroughly dried prime steam lard was crystal modified in 45 minutes at 85° C. with .4 per cent of sodium amide catalyst in powdered form, based on the weight of the dried lard. The lard was then treated with water to deactivate the catalyst, and then water washed and bleached.

The analysis of the water-washed, crystal modified lard showed:

Softening point _____ 100° F.
Melting point _____ 108° F.
Cloud _____ 80° F.
F. A. C. color _____ 7

*Example XII*

Thoroughly dried prime steam lard was crystal modified in 15 minutes at 95° C. with 0.4 per cent powdered sodium amide catalyst, based on the weight of the dried lard. The lard was then treated in the manner of Example VIII and analyzed:

Softening point _____ 103° F.
Melting point _____ 109° F.
A. S. T. M. cloud _____ 82° F.
Lovibond color _____ 5Y/0.5R
Mechanical cloud _____ 25.2° F.
Free fatty acids _____ 0.14%
Iodine number _____ 65.0
A. O. M. _____ 6 hours
I. P. V _____ 4.5

In each of the foregoing examples the percentage catalyst used is by weight, and is based on the weight of the lard being treated. In the case of Examples III–X, the catalyst used was sodium amide in the form of a dispersion in oil. Since this catalyst is about 50 per cent active, the actual percentage of active catalyst present should be considered to be one-half the percentage disclosed in the examples; e. g., 1.0 per cent in Example III. In the remaining examples the catalyst may be considered about 100 per cent active.

In order to detect the completion of the crystal modification reaction and show the fundamental alteration of the crystal structure produced by treating lard in accordance with the herein-disclosed process, the X-ray diffraction pattern of lard is examined before and after treatment by techniques similar to the methods described in Lutton, J. A. C. S. 67, 524 (1945) and Lutton, J. A. O. C. S. 27, 276 (1950). The X-ray diffraction pattern pictures of samples of regular lard and of crystal modified lard, taken according to the above methods, show that the stable crystal habit of the treated lard at the room temperatures encountered during sales distribution and storage is no longer the same as that of regular untreated lard and has been transformed from its natural beta phase to the beta prime phase. Furthermore, when the X-ray diffraction of crystal modified lard, hydrogenated cottonseed oil, and hydrogenated cottonseed oil shortenings are compared, it is found that each has the same crystal habit and crystallizes in the beta prime phase as its normal and stable form.

The improved lard obtained in accordance with the herein-described invention can be used as an all-purpose shortening in place of both the animal and vegetable shortenings heretofore discriminately employed becouse of their peculiar properties. The improved lard may thus be advantageously employed in the manufacture of cakes and icings as well as in the preparation of bread and pie crust. Although the invention has been illustrated as being particularly applicable to baked goods, it is also applicable to other food products such as the manufacture of candy and fried products. It is also understood that the improved fat may be advantageously used in lubricants, greases, cosmetics, medicated ointments and in many other industrial applications. The improved lard of the present invention can also be advantageously used in the prepartion of an improved margarine product.

From the foregoing specific examples describing the charactertistics and improved properties and new uses of crystal modified lard it will be very apparent to those skilled in the art that crystal modified lard is particularly useful in the preparation of improved shortening products. Thus, any shortening product which has heretofore consisted of a substantial proportion of animal triglyceride material, such as lard, will be provided with very substantially improved appearance and baking properties, particularly after holding at the usual temperatures encountered in commercial channels by substituting crystal modified lard for all or part of the unmodified lard in the shortening. The resulting shortening product has been found to have the desirable properties characteristic of an all-vegetable shortening while retaining the superior shortening properties of lard. The improved results obtained with crystal modified lard are in no way dependent upon the presence of monoglycerides, since the desirable properties are not lost as a result of the deodorization treatment.

The term "textural properties" as used in the claims refers to those performance characteristics of the fatty material which are indicative of the utility of the material as a shortening agent in baked goods, such as the wet cream test, the pound cake specific gravity, and the pound cake volume.

The terms "crystal modification" and "crystal modified lard" as used in the specification and claims to follow designate a transformation of the normal and stable crystal structure from one form to another, and in lard specifically designates a change from the beta phase to the beta prime phase.

Obviously, many modifications and variations of the invention as hereinbefore set forth may be made without departing from the spirit and scope thereof, and therefore only such limitations should be imposed as are indicated in the appended claims.

We claim:

1. A process of treating lard to improve its resistance to deterioration of physical appearance and textural properties, comprising contacting the lard with sodium amide at a temperature between the temperature at which the highest melting point constituent of the lard just remains in solution and 250° C. until permanently changing the normal crystallization habit and normal X-ray diffraction pattern of the said treated lard to resemble that of hydrogenated cottonseed oil shortening, and recovering the crystal modified lard free of the said catalyst.

2. A process of treating lard to improve its resistance to deterioration of physical appearance and textural properties, comprising contacting lard with sodium amide at a temperature between about 50° C. and 250° C. until permanently changing the normal crystallization habit and normal X-ray diffraction pattern of the said treated lard to resemble that of hydrogenated vegetable shortening, removing the said catalyst, and recovering the crystal modified lard free of the said catalyst.

3. In the process of treating lard wherein lard is heated in the presence of a crystal modification catalyst, the improvement comprising heating lard in the presence of at least about 0.15 per cent by weight based on the weight of the said lard of sodium amide at a temperature between about 50° C. and 250° C. for a period of between about 5 and 240 minutes until the normal crystallization habit and X-ray diffraction pattern of the treated lard are permanently changed to resemble that of hydrogenated vegetable oil shortening.

4. A process as described in claim 3 wherein the catalyst is an oil dispersion of sodium amide.

5. In the process of treating lard wherein lard is heated in the presence of a crystal modification catalyst, the improvement comprising heating lard in the presence of at least about 0.1 per cent by weight based on the weight of the said lard of sodium amide at a temperature between about 80° C. and 120° C. until the normal crystallization habit and X-ray diffraction pattern of the treated lard are permanently changed to resemble that of hydrogenated vegetable oil shortening.

6. A process of treating lard to substantially improve its resistance of deterioration of appearance and textural properties, and modify permanently the crystallization habit thereof, and to impart thereto the crystallization habit of hydrogenated vegetable oil shortening, which comprises heating lard substantially free of moisture in the presence of at least about 0.15 by weight based on the weight of the said lard of sodium amide as a catalyst at a temperature between about 80° C. and 100° C for a period of between about 60 and 10 minutes, respectively, and until the lard mixture becomes reddish-brown in color and resembles the X-ray diffraction pattern of hydrogenated vegetable oil shortening.

7. A process as in claim 6 wherein the sodium amide catalyst is in the form of a dispersion in oil.

8. A process as in claim 6 wherein the sodium amide catalyst is in the form of a dry, finely-divided powder.

DE WITTE NELSON.
KARL F. MATTIL.

No references cited.